United States Patent
Mahadevan et al.

(10) Patent No.: US 9,459,377 B2
(45) Date of Patent: Oct. 4, 2016

(54) POLYMERS COMPRISING SULFONIC ACID GROUPS

(71) Applicant: Johnson & Johnson Vision Care, Inc., Jacksonville, FL (US)

(72) Inventors: Shivkumar Mahadevan, Orange Park, FL (US); Thomas L. Maggio, Jacksonville, FL (US); Brent Matthew Healy, Jacksonville, FL (US); Leilani K. Sonoda, Atlantic Beach, FL (US); Michelle Carman Turnage, Jacksonville, FL (US); Hemantkumar Vashi, Jacksonville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 138 days.

(21) Appl. No.: 14/155,678

(22) Filed: Jan. 15, 2014

(65) Prior Publication Data
US 2015/0198744 A1    Jul. 16, 2015

(51) Int. Cl.
*G02B 1/04* (2006.01)
*C08F 230/08* (2006.01)
*C08G 77/28* (2006.01)
*C08G 77/442* (2006.01)

(52) U.S. Cl.
CPC ............ *G02B 1/043* (2013.01); *C08F 230/08* (2013.01); *C08G 77/28* (2013.01); *C08G 77/442* (2013.01)

(58) Field of Classification Search
CPC ............................. G02B 1/043; C08G 77/392
See application file for complete search history.

(56) References Cited

U.S. PATENT DOCUMENTS

| | | | |
|---|---|---|---|
| 3,408,429 A | 10/1968 | Wichterle | |
| 3,660,545 A | 5/1972 | Wichterle | |
| 3,808,178 A | 4/1974 | Gaylord | |
| 4,113,224 A | 9/1978 | Clark | |
| 4,120,570 A | 10/1978 | Gaylord | |
| 4,136,250 A | 1/1979 | Mueller | |
| 4,153,641 A | 5/1979 | Deichert | |
| 4,197,266 A | 4/1980 | Clark | |
| 4,605,712 A * | 8/1986 | Mueller et al. | 525/474 |
| 4,740,533 A | 4/1988 | Su | |
| 4,910,277 A | 3/1990 | Bambury | |
| 5,011,275 A | 4/1991 | Mueller | |
| 5,034,461 A | 7/1991 | Lai | |
| 5,070,215 A | 12/1991 | Bambury | |
| 5,244,981 A | 9/1993 | Seidner | |
| 5,314,960 A | 5/1994 | Spinelli | |
| 5,321,108 A | 6/1994 | Kunzler | |
| 5,331,067 A | 7/1994 | Seidner | |
| 5,371,147 A | 12/1994 | Spinelli | |
| 5,387,662 A | 2/1995 | Kunzler | |
| 5,451,617 A * | 9/1995 | Lai et al. | 523/107 |
| 5,539,016 A | 7/1996 | Kunzler | |
| 5,962,548 A | 10/1999 | Vanderlaan | |
| 5,998,498 A | 12/1999 | Vanderlaan | |
| 6,020,445 A | 2/2000 | Vanderlaan | |
| 6,367,929 B1 | 4/2002 | Maiden | |
| 6,702,983 B2 | 3/2004 | Hu | |
| 6,822,016 B2 | 11/2004 | McCabe | |
| 7,249,848 B2 | 7/2007 | Laredo | |
| 7,786,185 B2 | 8/2010 | Rathore | |
| 7,807,852 B2 | 10/2010 | Ricks-Laskoski | |
| 8,940,812 B2 * | 1/2015 | Reboul et al. | 523/107 |
| 2002/0016383 A1 | 2/2002 | Iwata | |
| 2003/0125498 A1 | 7/2003 | McCabe | |
| 2003/0162862 A1 | 8/2003 | McCabe | |
| 2004/0208983 A1 | 10/2004 | Hill | |
| 2006/0116495 A1 | 6/2006 | Stark | |
| 2008/0114123 A1 | 5/2008 | Tighe | |
| 2009/0023876 A1 | 1/2009 | Nunez | |
| 2009/0093596 A1 | 4/2009 | Salamone | |
| 2010/0010165 A1 * | 1/2010 | Hashemzadeh | 525/301 |
| 2010/0280146 A1 | 11/2010 | Vanderlaan | |
| 2011/0015352 A1 * | 1/2011 | Steffen et al. | 525/474 |
| 2011/0163254 A1 | 7/2011 | Stark | |
| 2011/0237766 A1 | 9/2011 | Maggio | |
| 2013/0184372 A1 * | 7/2013 | Reboul et al. | 523/107 |

FOREIGN PATENT DOCUMENTS

| | | |
|---|---|---|
| EP | 80539 B1 | 5/1986 |
| WO | WO 9305085 A1 | 3/1993 |
| WO | WO 9631792 A1 | 10/1996 |
| WO | WO 03022321 A2 | 3/2003 |
| WO | WO 03022322 A2 | 3/2003 |
| WO | 2013109482 A1 | 7/2013 |

OTHER PUBLICATIONS

PCT International Search Report, dated Mar. 26, 2015, for PCT Int'l Appln. No. PCT/US2015/010283.
Crivello, et al, vol. III, Photoinitiators for Free Radical Cationic & Anionic Photopolymerization, 2nd Edition; edited by G. Bradley; John Wiley and Sons; New York; 1998.
Cavicchi, Kevin A., Synthesis and Polymerization of Substituted Ammonium Sulfonate Monomers for Advanced Materials Applications, ACS Applied Materials and Interfaces 2012, 4, 518-526.
E.J. Castillo, J.L. Koenig, J.M. Anderson, J. Lo, Protein adsorption on hydrogels: II. Reversible and irreversible interactions between lysozyme and soft contact lens surfaces, Biomaterials, vol. 6, Issue 5, Sep. 1985, pp. 338-345.
Ibrhahim, Hisham Radwan, et al., Antimicrobial Effects of Lysozyme against Gram-Negative Bacteria Due to Covalent Binding of Palmitic Acid, J. Agric Food Chem., 1991, 39, 2077-2082.
PCT International Search Report, dated Apr. 25, 2013, for PCT Int'l Appln. No. PCT/US2013/021358.
PCT International Preliminary Report on Patentability, dated Jul. 31, 2014, for PCT Int'l Appln. No. PCT/US2013/021358.

* cited by examiner

*Primary Examiner* — Michael Pepitone
(74) *Attorney, Agent, or Firm* — Raef M. Shaltout

(57) ABSTRACT

The present invention relates to a polymers and hydrogels comprising a sulfonic acid component formed from reactive components comprising (i) at least one hydrophobic monomer and (ii) at least one sulfonic acid-containing component, wherein the sulfonic acid-containing component is comprised of a salt formed by a non-polymerizable, hydrophilic base and a polymerizable sulfonic acid. One or more embodiments provide that the at least one hydrophobic monomer comprises a silicone component.

23 Claims, No Drawings

POLYMERS COMPRISING SULFONIC ACID GROUPS

FIELD OF THE INVENTION

The present invention relates to polymers/hydrogels comprising sulfonic acid groups, and ophthalmic devices, such as contact lenses formed therefrom. Specifically provided are silicone polymers and silicone hydrogels.

BACKGROUND OF THE INVENTION

Soft contact lenses can generally be classified into two groups: conventional hydrogel contact lenses and silicone hydrogel contact lenses. Conventional hydrogel lenses are typically formed from hydrophilic polymers and copolymers such as those containing repeating units from hydroxyethyl methylacrylate ("HEMA") and methacrylic acid ("MAA").

Silicone hydrogel contact lenses offer an advantage over conventional hydrogel contact lenses in that they improve oxygen permeability, which improves oxygen availability to the cornea.

The incorporation of sulfonic acid-containing components into polymers used for both conventional and silicone hydrogel contact lenses provides hydrophilicity to the lenses, resulting in lenses having high water content. 2-Acrylamido-2-methylpropane sulfonic acid ("AMPS") is a sulfonic acid-containing monomer that has been incorporated into conventional hydrogel lenses. See, e.g., U.S. Pat. Nos. 5,451,617 and 5,011,275 and U.S. Patent Application No. 2008/0114123. Depending on the overall mixtures of monomers being used and the amount of sulfonic acid functionality desired, sulfonic acid-containing monomers may not always be soluble in a reactive monomer mixture.

With respect to silicone hydrogels, the AMPS monomer is not very soluble, which results in a hazy mixture. Methods of incorporating AMPS or other sulfonic acid-containing components in a silicone polymer/hydrogel were previously discussed by commonly assigned U.S. Patent Appln. Pub. No. 2013/0184372 (Reboul), which disclosed silicone polymers comprising a sulfonic acid component formed from reactive components comprising (i) at least one silicone component and (ii) at least one sulfonic acid-containing component, wherein the sulfonic acid-containing component is comprised of a non-polymerizable, hydrophobic cation and a polymerizable sulfonic acid. Such silicone polymers in turn can be used to manufacture silicone hydrogel contact lens having anionic properties and the benefits therefrom. The previous use of non-polymerizable, hydrophobic cations such as tripentylamine (TPA) to deliver polymerizable sulfonic acid as salts desirably gets rid of haze from the reactive monomer mixture, but removal of the cations after the silicone hydrogel contact lenses are made is necessary.

There is a need to provide chemistries to continue having clear reactive monomer mixtures while also providing efficient ways to remove any cations.

SUMMARY OF THE INVENTION

As provided herein, Applicants have discovered that delivery of sulfonic acid-containing components to reactive monomer mixtures may be achieved by using salts of the sulfonic acid-containing components whose cations are hydrophilic and weakly basic. In this way, efficiency of removing the cations after lens formation under wide-ranging conditions, such as pH, is improved. That is, for example, using a hydrophilic aromatic amine, such as N-methyl imidazole (MIMI) (pKa ~7.01±0.10), that is a weaker base than hydrophobic tripentylamine (TPA) (pKa ~9.99±0.50), permits removal of the hydrophilic aromatic amine under weakly acidic or basic conditions. In addition, MIMI can be removed with a lesser volume of weak acid as compared to TPA.

In one aspect, the present invention relates to a polymer comprising a sulfonic acid component formed from reactive components comprising (i) at least one monomer and (ii) at least one sulfonic acid-containing component, wherein the sulfonic acid-containing component is comprised of a salt formed by a non-polymerizable, hydrophilic base and a polymerizable sulfonic acid. The polymer is effective as a material for an ophthalmic device. In a specific embodiment, the at least one hydrophobic monomer comprises at least one silicone component thereby forming a silicone polymer.

In another aspect, the present invention relates to silicone hydrogel formed from a reaction mixture comprising (i) at least one monomer and (ii) at least one sulfonic acid-containing component, wherein the sulfonic acid-containing component is comprised of a salt formed by a non-polymerizable hydrophilic base and a polymerizable sulfonic acid. The hydrogel is effective as a material for an ophthalmic device. In a specific embodiment, the at least one hydrophobic monomer comprises at least one silicone component thereby forming a silicone hydrogel.

In another aspect, the present invention also relates to a biomedical device (e.g., a contact lens) comprising such polymer(s) and/or such hydrogel(s).

Other aspects, as well as features and advantages, of the present invention will be apparent from the detailed description of the invention and from the claims.

DETAILED DESCRIPTION OF THE INVENTION

Without intending to be bound by theory, it is thought that the hydrophilic and weakly basic cations used herein to form the sulfonic acid-containing salts, provide greater ease of removal of the cation after formation of contact lenses. Exemplary types of non-polymerizable, hydrophilic bases include, but are not limited to systems whose conjugate acids have pKa values of 9 or even 7.8 or less, or values between 3 and 9, 4 and 9, 4.5 and 9 or 3 and 7.8, 4 and 7.8 or 4.5 and 7.8. Specifically, azoles, aromatic amines and their derivatives having a pKa values of 7.8 or less are desirable, for example, imidazole (pKa of 7.18±0.61), N-methyl imidazole (pKa of 7.01±0.10), pyridine (pKa of 5.23±0.10), and aniline (pKa of 4.61±0.10).

It is believed that one skilled in the art can, based upon the description herein, utilize the present invention to its fullest extent. The following specific embodiments can be construed as merely illustrative, and not limitative of the remainder of the disclosure in any way whatsoever.

Unless defined otherwise, all technical and scientific terms used herein have the same meaning as commonly understood by one of ordinary skill in the art to which the invention belongs. Also, all publications, patent applications, patents, and other references mentioned herein are incorporated by reference.

DEFINITIONS

As used herein, a "biomedical device" is any article that is designed to be used while either in or on mammalian tissues or fluid. Examples of these devices include, but are not limited to, catheters, implants, stents, and ophthalmic devices such as intraocular lenses and contact lenses.

As used herein an "ophthalmic device" is any device which resides in or on the eye or any part of the eye, including the cornea, eyelids and ocular glands. These devices can provide optical correction, cosmetic enhancement, vision enhancement, therapeutic benefit (for example as bandages) or delivery of active components such as pharmaceutical and neutraceutical components, or a combination of any of the foregoing. Examples of ophthalmic devices include, but are not limited to, lenses and optical and ocular inserts, including, but not limited to punctal plugs and the like.

As used herein, the term "lens" refers to ophthalmic devices that reside in or on the eye. The term lens includes, but is not limited to soft contact lenses, hard contact lenses, intraocular lenses, and overlay lenses.

In one embodiment, the biomedical devices, ophthalmic devices and lenses of the present invention include silicone polymers or silicone hydrogels. These silicone hydrogels typically contain a silicone component and/or hydrophobic and hydrophilic monomers that are covalently bound to one another in the cured device.

As used herein "reactive mixture" refers to the mixture of components (both reactive and non-reactive) which are mixed together and subjected to polymerization conditions to form the silicone hydrogels of the present invention. The reactive mixture comprises reactive components such as monomers, macromers, prepolymers, cross-linkers, and initiators, and additives such as wetting agents, release agents, dyes, light absorbing compounds such as UV absorbers and photochromic compounds, any of which may be reactive or non-reactive but are capable of being retained within the resulting biomedical device, as well as pharmaceutical and neutraceutical compounds. It will be appreciated that a wide range of additives may be added based upon the biomedical device which is made, and its intended use. Concentrations of components of the reactive mixture are given in weight % of all components in the reaction mixture, excluding diluent. When diluents are used their concentrations are given as weight % based upon the amount of all components in the reaction mixture and the diluent.

As used herein, "polymerizable" means that the compound comprises at least one polymerizable functional group, such as acrylate, methacrylate, acrylamide, methacrylamide, vinyl, N-vinyl lactam, N-vinylamide, and styryl functional groups. "Non-polymerizable" means that the compound does not comprises such a polymerizable functional group.

As used herein, "hydrophilic" means that at least 5 grams of the compound(s) are soluble in 100 ml of deionized water at 25° C. under weakly acidic (pH>5<7) or basic conditions (pH>7<9), and in some embodiments 10 grams of the compound(s) are soluble in 100 ml of deionized water at 25° C. under weakly acidic or basic conditions. "Hydrophobic" means that 5 grams of the compound do not fully dissolve in 100 ml of deionized water at 25° C. under weakly acidic or basic conditions. The solubility of the compounds can be confirmed by visual observation, with any visible precipitants or turbidity indicating that the compound is hydrophobic. Solubility is beneficially measured after at least about 8 hours of mixing or stirring.

As used herein, the term "alkyl" refers to a hydrocarbon group of from 1 to 20 carbons, unless otherwise indicated.

As used herein, the term "weakly basic" refers to a pKa of the ammonium ion $ArN^+HX^-$ (where ArN represents the aromatic ring) or $ArN^+R^3X^-$, where Ar represents an aromatic ring and $R^3$ may be alkyl, aryl, H, or a combination thereof ranging between, for example, 3.0 and 9.0, 4.0 and 9.0, 4.5 and 9.0 or 3.0 and 7.8, 4.0 and 7.8 or 4.5 and 7.8.

The term "aromatic amine" refers to an amine whose amino group (nitrogen-containing group) is either bonded to an aromatic ring (e.g., aniline) or is a part of the aromatic ring (e.g., imidazole, and pyridine). Aromatic amines having a 5 or 6 membered ring are preferred in some embodiments. Reference to "derivatives thereof" means those compounds having an identical core but differing in substituents. For example, N-methyl imidazole is a derivative of imidazole. The reaction of an acid and a base produces a conjugate base and conjugate acid. The conjugate base is the ion or molecule remaining after the acid has lost a proton, and the conjugate acid is the species created when the base accepts the proton.

The term "hydrogel" refers to polymers which are cross-linked and absorb at least about 10 wt % water, and in some embodiments at least about 20 wt % water.

Silicone Component

A silicone-containing component (or silicone component) is one that contains at least one [—Si—O—Si] group, in a monomer, macromer or prepolymer. In one embodiment, the Si and attached O are present in the silicone-containing component in an amount greater than 20 weight percent, such as greater than 30 weight percent of the total molecular weight of the silicone-containing component. Useful silicone-containing components include polymerizable functional groups such as acrylate, methacrylate, acrylamide, methacrylamide, N-vinyl lactam, N-vinylamide, and styryl functional groups. Examples of silicone-containing components which are useful in this invention may be found in U.S. Pat. Nos. 3,808,178; 4,120,570; 4,136,250; 4,153,641; 4,740,533; 5,034,461; 5,962,548; 5,998,498; and 5,070,215, and European Patent No. 080539.

Suitable silicone-containing components include compounds of Formula I

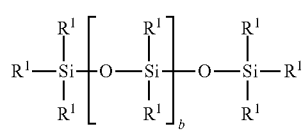

Formula I wherein:

$R^1$ is independently selected from monovalent reactive groups, monovalent alkyl groups, or monovalent aryl groups, any of the foregoing which may further comprise functionality selected from hydroxy, amino, oxa, carboxy, alkyl carboxy, alkoxy, amido, carbamate, carbonate, halogen or combinations thereof; and monovalent siloxane chains comprising 1-100 Si—O repeat units which may further comprise functionality selected from alkyl, hydroxy, amino, oxa, carboxy, alkyl carboxy, alkoxy, amido, carbamate, halogen or combinations thereof;

where b=0 to 500 (such as 0 to 100, such as 0 to 20), where it is understood that when b is other than 0, b is a distribution having a mode equal to a stated value; and wherein at least one $R^1$ comprises a monovalent reactive group, and in some embodiments from one to three $R^1$ comprise monovalent reactive groups.

As used herein "monovalent reactive groups" are groups that can undergo free radical and/or cationic polymerization. Non-limiting examples of free radical reactive groups include (meth)acrylates, styryls, vinyls, vinyl ethers, $C_{1-6}$alkyl(meth)acrylates, (meth)acrylamides, $C_{1-6}$alkyl (meth)acrylamides, N-vinyllactams, N-vinylamides, $C_{2-12}$alkenyls, $C_{2-12}$alkenylphenyls, $C_{2-12}$alkenylnaphthyls, $C_{2-6}$alkenylphenyl$C_{1-6}$alkyls, O-vinylcarbamates and O-vinylcarbonates. Non-limiting examples of cationic reactive groups include vinyl ethers or epoxide groups and mixtures thereof. In one embodiment the free radical reactive groups comprises (meth)acrylate, acryloxy, (meth)acrylamide, and mixtures thereof.

Suitable monovalent alkyl and aryl groups include unsubstituted monovalent $C_1$ to $C_{16}$alkyl groups, $C_6$-$C_{14}$ aryl groups, such as substituted and unsubstituted methyl, ethyl, propyl, butyl, 2-hydroxypropyl, propoxypropyl, polyethyleneoxypropyl, combinations thereof and the like.

In one embodiment b is zero, one $R^1$ is a monovalent reactive group, and at least 3 $R^1$ are selected from monovalent alkyl groups having one to 16 carbon atoms, and in another embodiment from monovalent alkyl groups having one to 6 carbon atoms. Non-limiting examples of silicone components of this embodiment include propenoic acid-2-methyl-2-hydroxy-3-[3-[1,3,3,3-tetramethyl-1-[(trimethylsilyl)oxy]-1-disiloxanyl]propoxy]propyl ester ("SiGMA"; structure in Formula II),

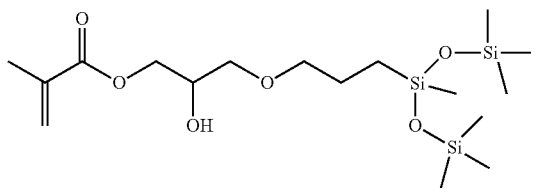

Formula II 2-hydroxy-3-methacryloxypropyloxypropyl-tris(trimethylsiloxy)silane, 3-methacryloxypropyltris(trimethylsiloxy)silane ("TRIS"), 3-methacryloxypropylbis(trimethylsiloxy) methylsilane, and 3-methacryloxypropylpentamethyl disiloxane.

In another embodiment, b is 2 to 20, 3 to 15 or in some embodiments 3 to 10; at least one terminal $R^1$ comprises a monovalent reactive group and the remaining $R^1$ are selected from monovalent alkyl groups having 1 to 16 carbon atoms, and in another embodiment from monovalent alkyl groups having 1 to 6 carbon atoms. In yet another embodiment, b is 3 to 15, one terminal $R^1$ comprises a monovalent reactive group, the other terminal $R^1$ comprises a monovalent alkyl group having 1 to 6 carbon atoms and the remaining $R^1$ comprise monovalent alkyl group having 1 to 3 carbon atoms. Non-limiting examples of silicone components of this embodiment include 3-methacryloxy-2-hydroxypropyloxy propyl butyl terminated polydimethylsiloxane (400-1000 MW)) ("OH-mPDMS"; structure in Formula III),

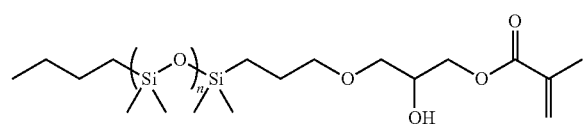

Formula III methacryloxypropyl n-butyl terminated polydimethylsiloxanes (800-1000 MW), ("mPDMS"; structure in Formula IV).

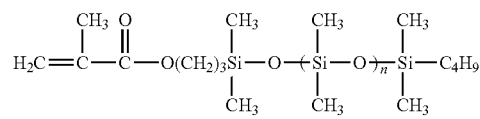

Formula IV

In another embodiment b is 5 to 400 or from 10 to 300, both terminal $R^1$ comprise monovalent reactive groups and the remaining $R^1$ are independently selected from monovalent alkyl groups having 1 to 18 carbon atoms which may have ether linkages between carbon atoms and may further comprise halogen.

In another embodiment, one to four $R^1$ comprises a vinyl carbonate or carbamate of Formula V:

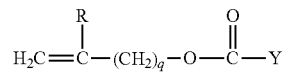

Formula V wherein: Y denotes O—, S— or NH—; R denotes, hydrogen or methyl; and q is 0 or 1.

The silicone-containing vinyl carbonate or vinyl carbamate monomers specifically include: 1,3-bis[4-(vinyloxycarbonyloxy)but-1-yl]tetramethyl-disiloxane; 3-(vinyloxycarbonylthio)propyl-[tris(trimethylsiloxy)silane]; 3-[tris(trimethylsiloxy)silyl]propyl allyl carbamate; 3-[tris(trimethylsiloxy)silyl]propyl vinyl carbamate; trimethylsilylethyl vinyl carbonate; trimethylsilylmethyl vinyl carbonate, and the compound of Formula VI.

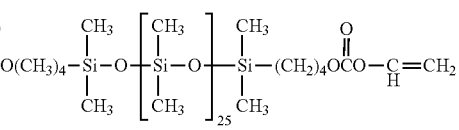

Formula VI

Where biomedical devices with modulii below about 200 are desired, only one $R^1$ shall comprise a monovalent reactive group and no more than two of the remaining $R^1$ groups will comprise monovalent siloxane groups.

Another suitable silicone containing macromer is compound of Formula VII (in which x+y is a number in the range of 10 to 30) formed by the reaction of fluoroether, hydroxy-terminated polydimethylsiloxane, isophorone diisocyanate and isocyanatoethylmethacrylate.

Formula VII

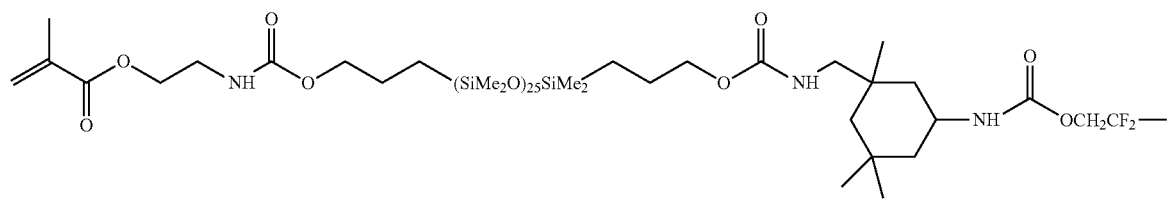

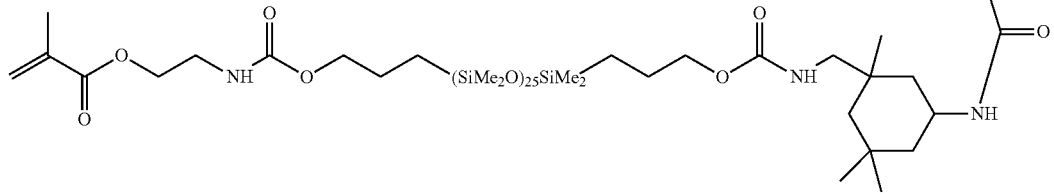

In another embodiment the silicone containing component is selected from acrylamide silicones of US20110237766. Other silicone components suitable for use in this invention include those described is WO 96/31792 such as macromers containing polysiloxane, polyalkylene ether, diisocyanate, polyfluorinated hydrocarbon, polyfluorinated ether and polysaccharide groups. Another class of suitable silicone-containing components includes silicone containing macromers made via GTP, such as those disclosed in U.S. Pat. Nos. 5,314,960, 5,331,067, 5,244,981, 5,371,147 and 6,367,929. U.S. Pat. Nos. 5,321,108; 5,387,662 and 5,539,016 describe polysiloxanes with a polar fluorinated graft or side group having a hydrogen atom attached to a terminal difluoro-substituted carbon atom. US 2002/0016383 describe hydrophilic siloxanyl methacrylates containing ether and siloxanyl linkages and crosslinkable monomers containing polyether and polysiloxanyl groups. Any of the foregoing polysiloxanes can also be used as the silicone-containing component in this invention.

In one embodiment of the present invention where a modulus of less than about 120 psi is desired, the majority of the mass fraction of the silicone-containing components used in the lens formulation should contain only one polymerizable functional group ("monofunctional silicone containing component"). In this embodiment, to insure the desired balance of oxygen transmissibility and modulus it is preferred that all components having more than one polymerizable functional group ("multifunctional components") make up no more than 10 mmol/100 g of the reactive components, and preferably no more than 7 mmol/100 g of the reactive components.

In one embodiment, the silicone component is selected from the group consisting of monomethacryloxypropyl terminated, mono-n-alkyl terminated polydialkylsiloxane; bis-3-acryloxy-2-hydroxypropyloxypropyl polydialkylsiloxane; methacryloxypropyl-terminated polydialkylsiloxane; mono-(3-methacryloxy-2-hydroxypropyloxy)propyl terminated, mono-alkyl terminated polydialkylsiloxane; and mixtures thereof.

In one embodiment, the silicone component is selected from monomethacrylate terminated polydimethylsiloxanes; bis-3-acryloxy-2-hydroxypropyloxypropyl polydialkylsiloxane; and mono-(3-methacryloxy-2-hydroxypropyloxy) propyl terminated, mono-butyl terminated polydialkylsiloxane; and mixtures thereof.

In one embodiment, the silicone component has an average molecular weight of from about 400 to about 4000 daltons.

The silicone containing component(s) may be present in amounts up to about 95 weight %, and in some embodiments from about 10 and about 80 and in other embodiments from about 20 and about 70 weight %, based upon all reactive components of the reactive mixture (e.g., excluding diluents).

Another silicone component may be SiMAA$_2$ (Methylbis(trimethylsilyloxy)-silyl-propylglycerol-methacrylate).

Sulfonic Acid-Containing Component

The reactive mixture contains at least one sulfonic acid-containing component, wherein said sulfonic acid-containing component is comprised of a non-polymerizable hydrophilic base and a polymerizable sulfonic acid. In one embodiment, the acid is added to the reactive mixture as a salt of a hydrophilic cation. Liquid salts mix readily with the reactive mixture. Solid salts, such as those comprising hydrophilic amines may also be used, so long as they are miscible in the reaction mixture.

The polymerizable sulfonic acid and the non-polymerizable hydrophilic base may also be added separately to the reactive mixture, and the salt is formed in situ within the reactive mixture. Examples of polymerizable sulfonic acids include, but are not limited to, 2-acrylamido-2-methylpropane sulfonic acid ("AMPS"; structure in Formula VIII), p-styrenesulfonic acid, 2-methacryloyloxyethylsulfonic acid ("2-SEMA"), 3-methacryloyloxy-2-hydroxypropylsulfonic acid, vinylsulfonic acid, and allylsulfonic acid.

Formula VIII

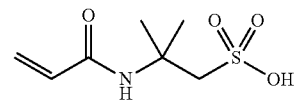

Incorporating a hydrophilic base of the present invention increases the solubility of the polymerizable sulfonic acid, such that the salts may be incorporated into polymerization mixtures which comprise silicone-containing components and polymerized to form polymers which are clear. Examples of non-polymerizable, hydrophilic cations or bases include amines, for example aromatic amines. Examples of such aromatic amines include, but are not limited to, azoles, such as imidazole, N-methyl imidazole, aniline, and pyridine.

In one embodiment, following the manufacture of the polymer and/or hydrogel, for example, silicone polymer and/or hydrogel, the non-polymerizable hydrophilic cation may be removed from the sulfonic acid-containing component via a weak acid such as dilute hydrochloric acid (e.g., a pH in the range of 5-7) or via a basic solution such as borate buffered saline solution (i.e., packing solution having pH 7.4-7.6) or dilute aqueous base, leaving an anionic sulfonic acid-containing component within the silicone polymer and/or hydrogel. Removal conditions typically are at room temperature (e.g., 25° C.±10° C. or even higher as needed) until a desired cation removal is achieved.

The sulfonic acid-containing component (e.g., in the form of a salt with a non-polymerizable hydrophilic cation within the reactive mixture or in the form of an anionic sulfonic acid-containing component within the polymer/hydrogel) may be present in a wide range of amounts, depending upon the specific balance of properties desired. For example, the molar ratio of polymerizable sulfonic acid to the hydrophilic cation may be no more than about 1, such as from about 0.2 to about 1, or more preferably from about 0.8 to about 1, or most preferably about 1. The sulfonate group of the sulfonic acid-containing component may be present in a concentration of all components excluding diluent of less than 2 mol/kg, such as from about 0.01 to about 0.2 mol/kg of the polymer, hydrogel (not including water), or reactive mixture (not including diluents). In one embodiment, the concentration of (i) the at least one silicone component and (ii) the sulfonic acid-containing component is less than about 5 mol/kg, such as about 0.001 to about 2.5 mol/kg, such as from about 0.01 to about 1 mol/kg.

Other Hydrophilic Components

In one embodiment, the reactive mixture may also contain at least one hydrophilic component. In one embodiment, the hydrophilic components can be any of the hydrophilic monomers known to be useful to make hydrogels.

One class of suitable hydrophilic monomers includes acrylic- or vinyl-containing monomers. Such hydrophilic monomers may themselves be used as crosslinking agents, however, where hydrophilic monomers having more than one polymerizable functional group are used, their concentration should be limited as discussed above to provide a contact lens having the desired modulus.

The term "vinyl-type" or "vinyl-containing" monomers refer to monomers containing the vinyl grouping (—CH=CH$_2$) and that are capable of polymerizing. Examples of hydrophilic vinyl-containing monomers include, but are not limited to, monomers such as N-vinyl amides, N-vinyl lactams (e.g. n-vinylpyrrolidone ("NVP")), N-vinyl-N-methyl acetamide, N-vinyl-N-ethyl acetamide, and N-vinyl-N-ethyl formamide, N-vinyl formamide. Alternative vinyl-containing monomers include, but are not limited to, 1-methyl-3-methylene-2-pyrrolidone, 1-methyl-5-methylene-2-pyrrolidone, and 5-methyl-3-methylene-2-pyrrolidone.

"Acrylic-type" or "acrylic-containing" monomers are those monomers containing the acrylic group: (CH$_2$=CRCOX) wherein R is H or CH$_3$, and X is O or N, which are also known to polymerize readily, such as N,N-dimethyl acrylamide ("DMA"), 2-hydroxyethyl methacrylate ("HEMA"), glycerol methacrylate, 2-hydroxyethyl methacrylamide, polyethyleneglycol monomethacrylate, methacrylic acid, mixtures thereof and the like.

Other hydrophilic monomers that can be employed in the invention include, but are not limited to, polyoxyethylene polyols having one or more of the terminal hydroxyl groups replaced with a functional group containing a polymerizable double bond. Examples include polyethylene glycol, ethoxylated alkyl glucoside, and ethoxylated bisphenol A reacted with one or more molar equivalents of an end-capping group such as isocyanatoethyl methacrylate ("IEM"), methacrylic anhydride, methacryloyl chloride, vinylbenzoyl chloride, or the like, to produce a polyethylene polyol having one or more terminal polymerizable olefinic groups bonded to the polyethylene polyol through linking moieties such as carbamate or ester groups.

Still further examples are the hydrophilic vinyl carbonate or vinyl carbamate monomers disclosed in U.S. Pat. No. 5,070,215 and the hydrophilic oxazolone monomers disclosed in U.S. Pat. No. 4,910,277. Other suitable hydrophilic monomers will be apparent to one skilled in the art.

In one embodiment the hydrophilic component comprises at least one hydrophilic monomer such as DMA, HEMA, glycerol methacrylate, 2-hydroxyethyl methacrylamide, NVP, N-vinyl-N-methyl acrylamide, polyethyleneglycol monomethacrylate, and combinations thereof. In another embodiment, the hydrophilic monomers comprise at least one of DMA, HEMA, NVP and N-vinyl-N-methyl acrylamide and mixtures thereof. In another embodiment, the hydrophilic monomer comprises DMA and/or HEMA.

The hydrophilic component(s) (e.g., hydrophilic monomer(s)) may be present in a wide range of amounts, depending upon the specific balance of properties desired. In one embodiment, the amount of the hydrophilic component is up to about 60 weight %, such as from about 5 and about 40 weight % based upon all reactive components.

Polymerization Initiator

One or more polymerization initiators may be included in the reaction mixture. Examples of polymerization initiators include, but are not limited to, compounds such as lauryl peroxide, benzoyl peroxide, isopropyl percarbonate, azobisisobutyronitrile, and the like, that generate free radicals at moderately elevated temperatures, and photoinitiator systems such as aromatic alpha-hydroxy ketones, alkoxyoxybenzoins, acetophenones, acylphosphine oxides, bisacylphosphine oxides, and a tertiary amine plus a diketone, mixtures thereof and the like. Illustrative examples of photoinitiators are 1-hydroxycyclohexyl phenyl ketone, 2-hydroxy-2-methyl-1-phenyl-propan-1-one, bis(2,6-dimethoxybenzoyl)-2,4-4-trimethylpentyl phosphine oxide (DMBAPO), bis(2,4,6-trimethylbenzoyl)-phenyl phosphineoxide (Irgacure 819), 2,4,6-trimethylbenzyldiphenyl phosphine oxide and 2,4,6-trimethylbenzoyl diphenylphosphine oxide, benzoin methyl ester and a combination of camphorquinone and ethyl 4-(N,N-dimethylamino)benzoate. Commercially available visible light initiator systems include, but are not limited to, Irgacure 819®, Irgacure 1700®, Irgacure 1800®, Irgacure 1850® (all from Ciba Specialty Chemicals) and Lucirin TPO initiator (available from BASF). Commercially available UV photoinitiators include Darocur 1173 and Darocur 2959 (Ciba Specialty Chemicals). These and other photoinitiators which may be used are disclosed in Volume III, Photoinitiators for Free Radical Cationic & Anionic Photopolymerization, 2$^{nd}$ Edition by J. V. Crivello & K. Dietliker; edited by G. Bradley; John Wiley and Sons; New York; 1998.

The polymerization initiator is used in the reaction mixture in effective amounts to initiate photopolymerization of the reaction mixture, such as from about 0.1 to about 2 weight %. Polymerization of the reaction mixture can be initiated using the appropriate choice of heat or visible or ultraviolet light or other means depending on the polymerization initiator used. Alternatively, initiation can be conducted without a photoinitiator using, for example, e-beam. However, when a photoinitiator is used, the preferred initiators are bisacylphosphine oxides, such as bis(2,4,6-trimethylbenzoyl)-phenyl phosphine oxide (Irgacure 819®) or a combination of 1-hydroxycyclohexyl phenyl ketone and DMBAPO, and in another embodiment the method of polymerization initiation is via visible light activation.

Internal Wetting Agent

In one embodiment, the reaction mixture includes one or more internal wetting agents. Internal wetting agents may include, but are not limited to, high molecular weight, hydrophilic polymers such as those described in U.S. Pat. Nos. 6,367,929; 6,822,016; 7,786,185; PCT Patent Application Nos. WO03/22321 and WO03/22322, or reactive, hydrophilic polymers such as those described in U.S. Pat.

No. 7,249,848. Examples of internal wetting agents include, but are not limited to, polyamides such as poly(N-vinyl pyrrolidone) and poly(N-vinyl-N-methyl acetamide).

The internal wetting agent(s) may be present in a wide range of amounts, depending upon the specific parameter desired. In one embodiment, the amount of the wetting agent(s) is up to about 50 weight %, such as from about 5 and about 40 weight %, such as from about 6 to about 30 weight % based upon all reactive components.

Other Components

Other components that can be present in the reaction mixture used to form the contact lenses of this invention include, but are not limited to, compatibilizing components (such as those disclosed in US Patent Application Nos. 2003/162862 and 2003/125498), ultra-violet absorbing compounds, medicinal agents, antimicrobial compounds, copolymerizable and nonpolymerizable dyes, release agents, reactive tints, pigments, combinations thereof and the like. In one embodiment, the sum of additional components may be up to about 20 wt %.

Diluents

In one embodiment, the reactive components (e.g., silicone containing component, 2-hydroxyethyl acrylamide, hydrophilic monomers, wetting agents, and/or other components) are mixed together either with or without a diluent to form the reaction mixture.

In one embodiment a diluent is used having a polarity sufficiently low to solubilize the non-polar components in the reactive mixture at reaction conditions. One way to characterize the polarity of the diluents of the present invention is via the Hansen solubility parameter, $\delta p$. In certain embodiments, the $\delta p$ is less than about 10, and preferably less than about 6. Suitable diluents are further disclosed in US Patent Application No. 20100280146 and U.S. Pat. No. 6,020,445.

Classes of suitable diluents include, without limitation, alcohols having 2 to 20 carbons, amides having 10 to 20 carbon atoms derived from primary amines, ethers, polyethers, ketones having 3 to 10 carbon atoms, and carboxylic acids having 8 to 20 carbon atoms. As the number of carbons increase, the number of polar moieties may also be increased to provide the desired level of water miscibility. In some embodiments, primary and tertiary alcohols are preferred. Preferred classes include alcohols having 4 to 20 carbons and carboxylic acids having 10 to 20 carbon atoms.

In one embodiment, the diluents are selected from 1,2-octanediol, t-amyl alcohol, 3-methyl-3-pentanol, decanoic acid, 3,7-dimethyl-3-octanol, 2-methyl-2-pentanol, 2-ethyl-1-butanol, 3,3-dimethyl-2-butanol, tripropylene methyl ether (TPME), butoxy ethyl acetate, mixtures thereof and the like.

In one embodiment, the diluents are selected from those that have some degree of solubility in water. In some embodiments at least about three percent of the diluent is miscible water. Examples of water soluble diluents include, but are not limited to, 1-octanol, 1-pentanol, 1-hexanol, 2-hexanol, 2-octanol, 3-methyl-3-pentanol, 2-pentanol, t-amyl alcohol, tert-butanol, 2-butanol, 1-butanol, ethanol, decanoic acid, octanoic acid, dodecanoic acid, 1-ethoxy-2-propanol, 1-tert-butoxy-2-propanol, EH-5 (commercially available from Ethox Chemicals), 2,3,6,7-tetrahydroxy-2,3,6,7-tetramethyl octane, 9-(1-methylethyl)-2,5,8,10,13,16-hexaoxaheptadecane, 3,5,7,9,11,13-hexamethoxy-1-tetradecanol, mixtures thereof and the like.

Curing of Silicone Polymer/Hydrogel and Manufacture of Lens

The reactive mixture of the present invention may be cured via any known process for molding the reaction mixture in the production of contact lenses, including spincasting and static casting. Spincasting methods are disclosed in U.S. Pat. Nos. 3,408,429 and 3,660,545, and static casting methods are disclosed in U.S. Pat. Nos. 4,113,224 and 4,197,266. In one embodiment, the contact lenses of this invention are formed by the direct molding of the silicone hydrogels, which is economical, and enables precise control over the final shape of the hydrated lens. For this method, the reaction mixture is placed in a mold having the shape of the final desired silicone hydrogel and the reaction mixture is subjected to conditions whereby the monomers polymerize, to thereby produce a polymer in the approximate shape of the final desired product.

In one embodiment, after curing, the lens is subjected to extraction to remove unreacted components and release the lens from the lens mold. The extraction may be done using conventional extraction fluids, such organic solvents, such as alcohols or may be extracted using aqueous solutions.

Aqueous solutions are solutions which comprise water. In one embodiment the aqueous solutions of the present invention comprise at least about 30 weight % water, in some embodiments at least about 50 weight % water, in some embodiments at least about 70% water and in others at least about 90 weight % water. Aqueous solutions may also include additional water soluble components such as release agents, wetting agents, slip agents, pharmaceutical and nutraceutical components, combinations thereof and the like. Release agents are compounds or mixtures of compounds which, when combined with water, decrease the time required to release a contact lens from a mold, as compared to the time required to release such a lens using an aqueous solution that does not comprise the release agent. In one embodiment the aqueous solutions comprise less than about 10 weight %, and in others less than about 5 weight % organic solvents such as isopropyl alcohol, and in another embodiment are free from organic solvents. In these embodiments the aqueous solutions do not require special handling, such as purification, recycling or special disposal procedures.

In various embodiments, extraction can be accomplished, for example, via immersion of the lens in an aqueous solution or exposing the lens to a flow of an aqueous solution. In various embodiments, extraction can also include, for example, one or more of: heating the aqueous solution; stirring the aqueous solution; increasing the level of release aid in the aqueous solution to a level sufficient to cause release of the lens; mechanical or ultrasonic agitation of the lens; and incorporating at least one leach aid in the aqueous solution to a level sufficient to facilitate adequate removal of unreacted components from the lens. The foregoing may be conducted in batch or continuous processes, with or without the addition of heat, agitation or both.

Some embodiments can also include the application of physical agitation to facilitate leach and release. For example, the lens mold part to which a lens is adhered, can be vibrated or caused to move back and forth within an aqueous solution. Other embodiments may include ultrasonic waves through the aqueous solution.

The lenses may be sterilized by known means such as, but not limited to autoclaving.

Contact Lens Properties

It will be appreciated that all of the tests specified herein have a certain amount of inherent test error. Accordingly, results reported herein are not to be taken as absolute numbers, but numerical ranges based upon the precision of the particular test.

EXAMPLES

These examples do not limit the invention. They are meant only to suggest a method of practicing the invention. Those knowledgeable in contact lenses as well as other specialties may find other methods of practicing the invention. The following abbreviations are used in the examples below:

AMPS 2-Acrylamido-2-methylpropane sulfonic acid
TPA Tripentylamine
MIMI N-Methyl imidazole
Blue HEMA the reaction product of Reactive Blue 4 and HEMA, as described in Example 4 of U.S. Pat. No. 5,944,853
D30 3,7-dimethyl-3-octanol
DMA N,N-dimethylacrylamide
HEMA 2-hydroxyethyl methacrylate
Irgacure1870 blend of bis(2,6-dimethoxybenzoyl)-2,4,4-trimethyl phenylphosphineoxide and of 1-hydroxycyclohexyl-phenylketone
Irgacure 184 1-hydroxycyclohexyl-phenylketone
mPDMS 1000 monomethacryloxypropyl terminated mono-n-butyl terminated polydimethylsiloxane (Mn=800 to 1000 g/mol)
Norbloc 2-(2'-hydroxy-5-methacrylyloxyethylphenyl)-2H-benzotriazole
PVP K-90 poly(N-vinyl pyrrolidone)
TEGDMA tetraethyleneglycol dimethacrylate
SiMAA2 Methyl-bis(trimethylsilyloxy)-silyl-propylglycerol-methacrylate

Example 1

Manufacture of Silicone Hydrogel Formulations with AMPS Salt Formed in Situ in the Reactive Mixture An inventive blend ("Blend 1") and a comparative blend ("Comparative Blend 2") were prepared as shown below in Table 1. The AMPS ammonium salt was first dissolved in hydrophilic monomers (TEGDMA and HEMA) by mixing on a jar roller. The rest of the components were then added and mixed on ajar roller overnight. All blends were clear blue and without phase separation.

For Blend 1, the AMPS-N-methyl imidazole salt was prepared in situ. For Comparative Blend 2, the AMPS-tripentylamine salt was prepared in situ.

TABLE 1

Blend Formulations

| Component | Blend 1 wt % | Comparative Blend 2 wt % |
|---|---|---|
| DMA | 23.67 | 23.67 |
| Blue HEMA | 0.02 | 0.02 |
| HEMA | 6.00 | 6.00 |
| TEGDMA | 1.50 | 1.50 |
| SiMAA2 | 28.00 | 28.00 |
| mPDMS | 31.00 | 31.00 |
| Norbloc | 2.00 | 2.00 |
| Irgacure 1870 | 0.34 | 0.34 |
| PVP K90 | 7.00 | 7.00 |
| AMPS | 0.33 | 0.33 |
| Irgacure 184 | 0.14 | 0.14 |
| Diluent | | |
| Total | 23 | 23 |
| D30 (diluent)* | 99.56 | 98.79 |
| Tripentylamine (TPA) (diluent)* | — | 1.21 |
| N-methyl imidazole (MIMI) | 0.44 | — |

TABLE 1-continued

*Amounts of diluents are shown as weight percent of combination of all components. Amounts of other components are shown as weight percent of reactive components, excluding diluents.

Example 2

Manufacture of Hydrogel Contact Lens

The reactive monomer mixtures of Blend 1 and Comparative Blend 2 were cured under a nitrogen atmosphere at a temperature of 60° C. by exposure to visible light (Philips TL03 bulbs, intensity ~2 mW/cm$^2$) for 15 minutes. Each cured polymer was then treated directly with dilute aqueous hydrochloric acid and borate buffered saline solution (packing solution, pH 7.4-7.6) to determine the relative extraction efficiencies of the two bases (MIMI and TPA—comparative).

The cured polymers (6 lenses each) were transferred into scintillation vials for the extraction studies. The weights of the contact lenses transferred into each vial were recorded to determine the extraction efficiencies. Table II provides the weights of each system transferred and the theoretical maximum values of the extractable amines.

TABLE II

Cured polymers from reactive monomer mixtures containing TPA and MIMI. Theoretical amounts calculated based on 0.44*23 wt % of MIMI and 1.21*23 wt % of TPA per the given formulations.

| | Weight of Cured Polymer + Diluent (mg) | | | |
|---|---|---|---|---|
| Extraction Medium | AMPS: MIMI | Theoretical [MIMI] (µg/mL) | AMPS: TPA | Theoretical [TPA] (µg/mL) |
| 12.0 mL of packing solution | 124.3 | 10.5 | 124.7 | 28.9 |
| 12.0 mL of packing solution | 121.8 | 10.3 | 124.1 | 28.8 |
| 12.0 ml of 2.54 mM HCl | 122.6 | 10.3 | 125.6 | 29.1 |
| 12.0 ml of 2.54 mM HCl | 122.1 | 10.3 | 123.9 | 28.7 |

The samples were extracted in the given media for 20 hours at room temperature and the concentrations of MIMI and TPA in solution were measured using the methods provided below. Packing solution is a borate buffered solution containing 0.185 wt % sodium borate, 0.926 wt % boric acid.

Tripentylamine analysis was performed on the extracts by gas chromatography. The lens extracts were diluted with an equal volume of 2-propanol (sample prep) prior to injection.

Standards preparation and chromatography were performed under the conditions: extraction of tripentylamine in 0.0012M sodium carbonate in 90/10 IPA/water followed by injection of the sample into a gas chromatograph with flame ionization detection (FID). The tripentylamine used was observed as two peaks in the gas chromatogram.

Methyl imidazole content was measured using an isocratic HPLC/UV method described as follows. Calibration standards were made from a 1000 ppm solution of 1-methyl imidazole in 0.0025N HCl. The 1-methyl imidazole was obtained from Sigma Aldrich.

Mobile phase: Mixture of 5.0% acetonitrile and 95% 0.005N aqueous solution of 1-octanesulfonic acid sodium salt in Milli-Q water, adjusted to a pH ~2.5 with phosphoric acid. Once the 1-methyl imidazole eluted, the column was washed with 100% acetonitrile for four minutes then re-equilibrated for ten minutes prior to the next run.

Column—Agilent C18 column (3.5 μm 4.6×150 mm PN763953-902).

Flow rate—1.0 mL per minute.
Column temperature—30° C.
UV detection—217 nm.

N-methyl imidazole was observed at a retention time of approximately 10.8 minutes.

The measured amounts of tripentylamine and N-methylimidazole from each of the systems described above are provided in Table III.

TABLE III

Quantification of extracted bases used from cured contact lenses under weakly acidic (dil. HCl) and basic (packing solution) conditions.

| Extraction Medium | Blend 1 N-methyl imidazole | | | Comparative Blend 2 Tripentylamine | | |
|---|---|---|---|---|---|---|
| | Theoretical (μg/mL) | Measured (μg/mL) | % Recovery | Theoretical (μg/mL) | Measured (μg/mL) | % Recovery |
| 12.0 mL of packing solution | 10.5 | 10.1 | 96.3 | 28.9 | ND | ND |
| 12.0 mL of packing solution | 10.3 | 10.1 | 98.3 | 28.8 | ND | ND |
| 12.0 ml of 2.54 mM HCl | 10.3 | 9.9 | 95.8 | 29.1 | 29.5 | 101.3 |
| 12.0 ml of 2.54 mM HCl | 10.3 | 10.0 | 97.1 | 28.7 | 29.4 | 102.3 |

Comparing the extraction data from Blend 1 with Comparative Blend 2 it can be seen that salts comprising non-polymerizable, hydrophilic bases, such as imidazole, are much more readily removed from a hydrogel (> about 95% recovery) using a neutral solution, such as packing solution than tripentylamine, which showed no detectable recovery with packing solution.

It is understood that while the invention has been described in conjunction with the detailed description thereof, that the foregoing description is intended to illustrate and not limit the scope of the invention, which is defined by the scope of the appended claims. Other aspects, advantages, and modifications are within the claims.

What is claimed is:

1. A silicone-containing polymer comprising a sulfonic acid component formed from reactive components comprising (i) at least one silicone component and (ii) at least one sulfonic acid-containing component, wherein said sulfonic acid-containing component is comprised of a salt formed by a non-polymerizable, hydrophilic base comprising a component whose conjugate acid has a pKa is 9 or less and a polymerizable sulfonic acid.

2. The silicone-containing polymer of claim 1, wherein said polymerizable sulfonic acid is selected from the group consisting of 2-acrylamido-2-methylpropane sulfonic acid, p-styrenesulfonic acid, 2-methacryloyloxyethylsulfonic acid, 3-methacryloyloxy-2-hydroxypropylsulfonic acid, allylsulfonic acid, 3-methacryloyloxypropylsulfonic acid, vinylsulfonic acid, and combinations thereof.

3. The silicone-containing polymer of claim 1, wherein said hydrophilic base comprises an aromatic amine whose conjugate acid has a pKa of 7.8 or less.

4. The silicone-containing polymer of claim 3, wherein said aromatic amine is selected from the group consisting of imidazole, aniline, pyridine, and derivatives thereof.

5. A silicone-containing polymer of claim 1, wherein said at least one silicone component is selected from compounds of Formula I:

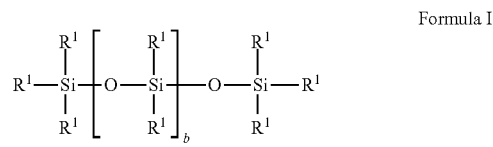

Formula I wherein:
R¹ is independently selected from monovalent reactive groups, monovalent alkyl groups, or monovalent aryl groups, any of the foregoing which may further comprise functionality selected from hydroxy, amino, oxa, carboxy, alkyl carboxy, alkoxy, amido, carbamate, carbonate, halogen or combinations thereof; and monovalent siloxane chains comprising 1-100 Si—O repeat units which may further comprise functionality selected from alkyl, hydroxy, amino, oxa, carboxy, alkyl carboxy, alkoxy, amido, carbamate, halogen or combinations thereof;

where b=0 to 500, where it is understood that when b is other than 0, b is a distribution having a mode equal to a stated value; and wherein at least one R¹ comprises a monovalent reactive group.

6. The silicone-containing polymer of claim 1, wherein said at least one silicone component is selected from the group consisting of methacryloxypropyl terminated, mono-n-alkyl terminated polydialkylsiloxane; bis-3-acryloxy-2-hydroxypropyloxypropyl polydialkylsiloxane; methacryloxypropyl-terminated polydialkylsiloxane; mono-(3-methacryloxy-2-hydroxypropyloxy)propyl terminated, mono-alkyl terminated polydialkylsiloxane; and mixtures thereof.

7. The silicone-containing polymer of claim 1, wherein said at least one silicone component is selected from monomethacrylate terminated polydimethylsiloxanes; bis-3-acryloxy-2-hydroxypropyloxypropyl polydialkylsiloxane; mono-(3-methacryloxy-2-hydroxypropyloxy)propyl terminated, mono-butyl terminated polydialkylsiloxane; and mixtures thereof.

8. The silicone-containing polymer of claim 1, wherein said at least one silicone component comprises 3-methacryloxy-2-hydroxypropyloxy-n-butyl terminated polydialkylsiloxane.

9. The silicone-containing polymer of claim 1, wherein said reactive components further comprise at least one non-ionic hydrophilic acrylic-containing monomer.

10. The silicone-containing polymer of claim 9, wherein said at least one non-ionic hydrophilic acrylic-containing monomer comprises HEMA, DMA and mixtures thereof.

11. The silicone-containing polymer of claim 1, wherein the ratio of (i) said at least one silicone component and (ii) said sulfonic acid-containing component is less than about 100 kg/mol.

12. A silicone hydrogel comprising the silicone-containing polymer of claim 1.

13. A silicone hydrogel formed from a reaction mixture comprising (i) at least one silicone component and (ii) at least one sulfonic acid-containing component, wherein said sulfonic acid-containing component is comprised of a salt formed by a non-polymerizable, hydrophilic base comprising a component whose conjugate acid has a pKa is 9 or less and a polymerizable sulfonic acid.

14. The silicone hydrogel of claim 13, wherein the sulfonate group of the at least one sulfonic acid-containing component is present in a concentration to all components excluding diluent of less than 2 mol/kg.

15. The silicone hydrogel of claim 13, wherein the reaction mixture further comprises a polyamide.

16. The silicone hydrogel of claim 13, wherein said polymerizable sulfonic acid is selected from the group consisting of 2-acrylamido-2-methylpropane sulfonic acid, p-styrenesulfonic acid, 2-methacryloyloxyethylsulfonic acid, 3-methacryloyloxy-2-hydroxypropylsulfonic acid, allylsulfonic acid, 3-methacryloyloxypropylsulfonic acid, vinylsulfonic acid, and combinations thereof, and wherein the hydrophilic base comprises an aromatic amine whose conjugate acid has a pKa of 7.8 or less.

17. The silicone hydrogel of claim 16, wherein said aromatic amine is selected from the group consisting of imidazole, aniline, pyridine, and derivatives.

18. A contact lens comprising a silicone-containing polymer of claim 1.

19. A contact lens formed from a silicone hydrogel of claim 13.

20. A biomedical device comprising a silicone-containing polymer of claim 1.

21. A biomedical device formed from a silicone hydrogel of claim 13.

22. A method of making a contact lens or a biomedical device, the method comprising:
   reacting the reactive components of claim 1 to form the contact lens or the biomedical device.

23. The silicone hydrogel of claim 16, wherein said aromatic amine is N-methyl imidazole.

* * * * *